(No Model.)
C. B. CHURCH.
ICE HARVESTER.
No. 281,752. Patented July 24, 1883.
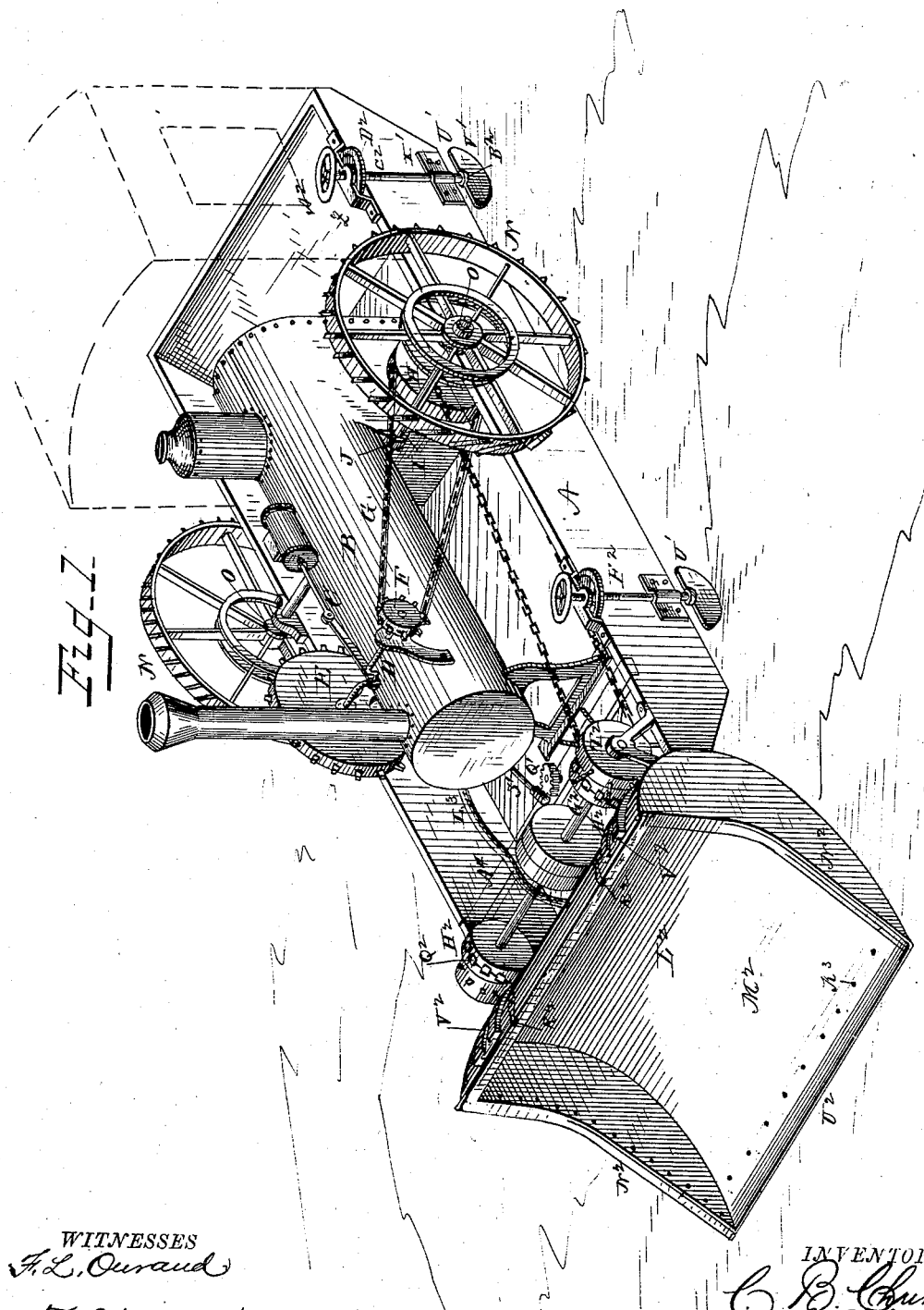
WITNESSES
F. L. Durand
F. B. Noyes.
INVENTOR
C. B. Church,
by J. R. Littell
Attorney (No Model.)
C. B. CHURCH.
ICE HARVESTER.
No. 281,752. Patented July 24, 1883.
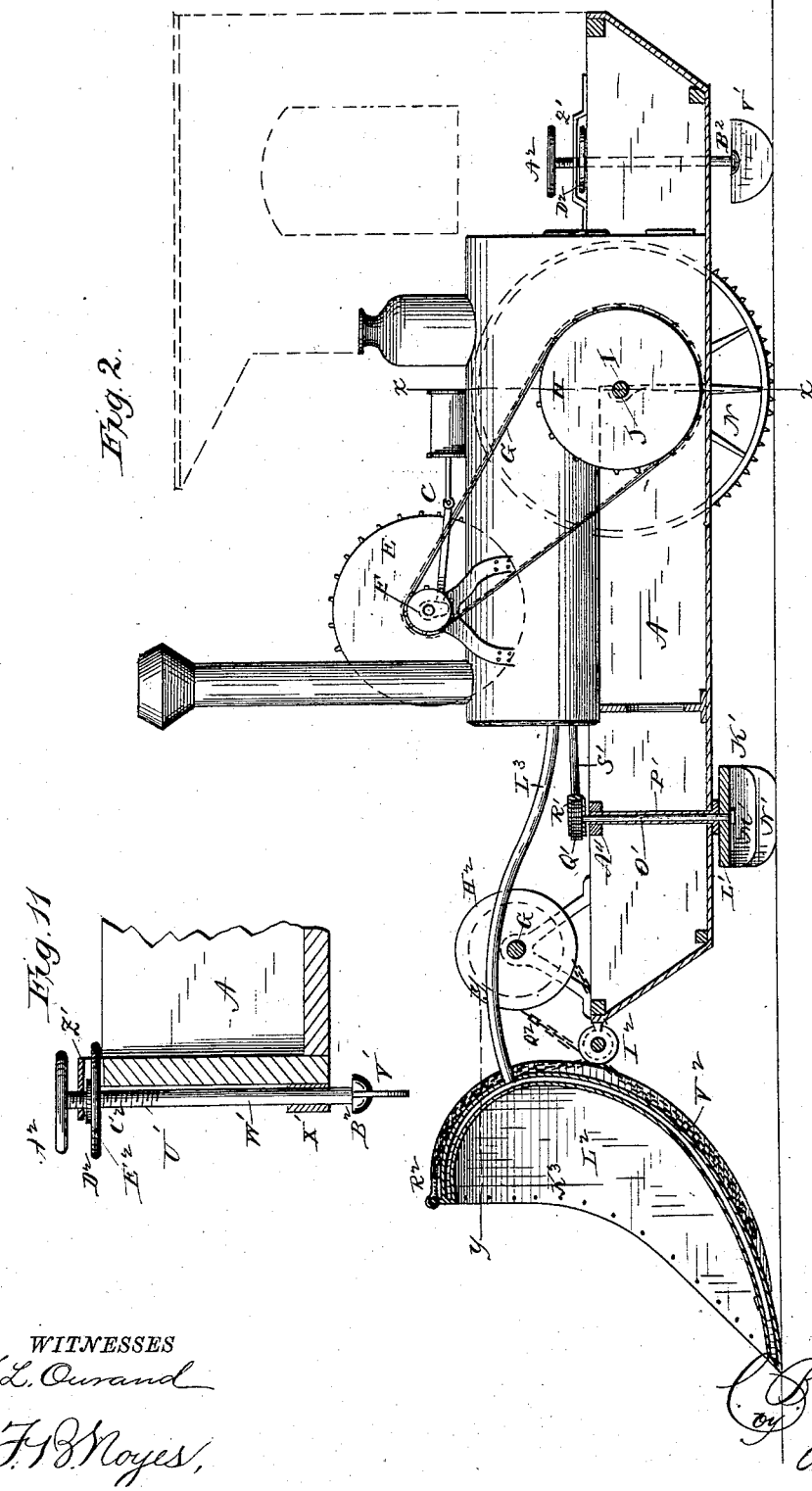
WITNESSES
F. L. Ourand
F. H. Noyes
INVENTOR
C. B. Church,
by J. R. Littell,
Attorney (No Model.) C. B. CHURCH.
ICE HARVESTER.
No. 281,752. Patented July 24, 1883.
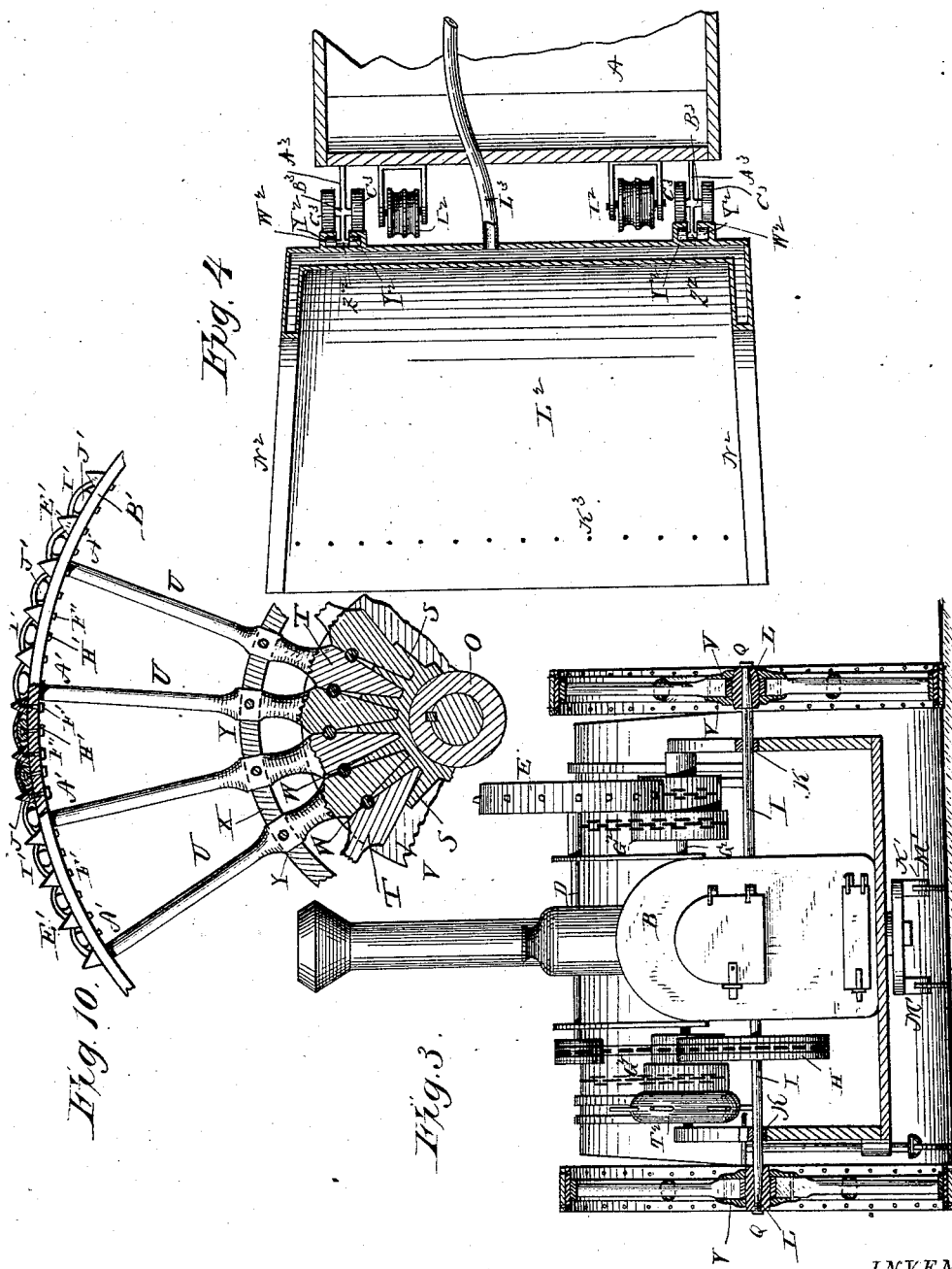
WITNESSES
INVENTOR

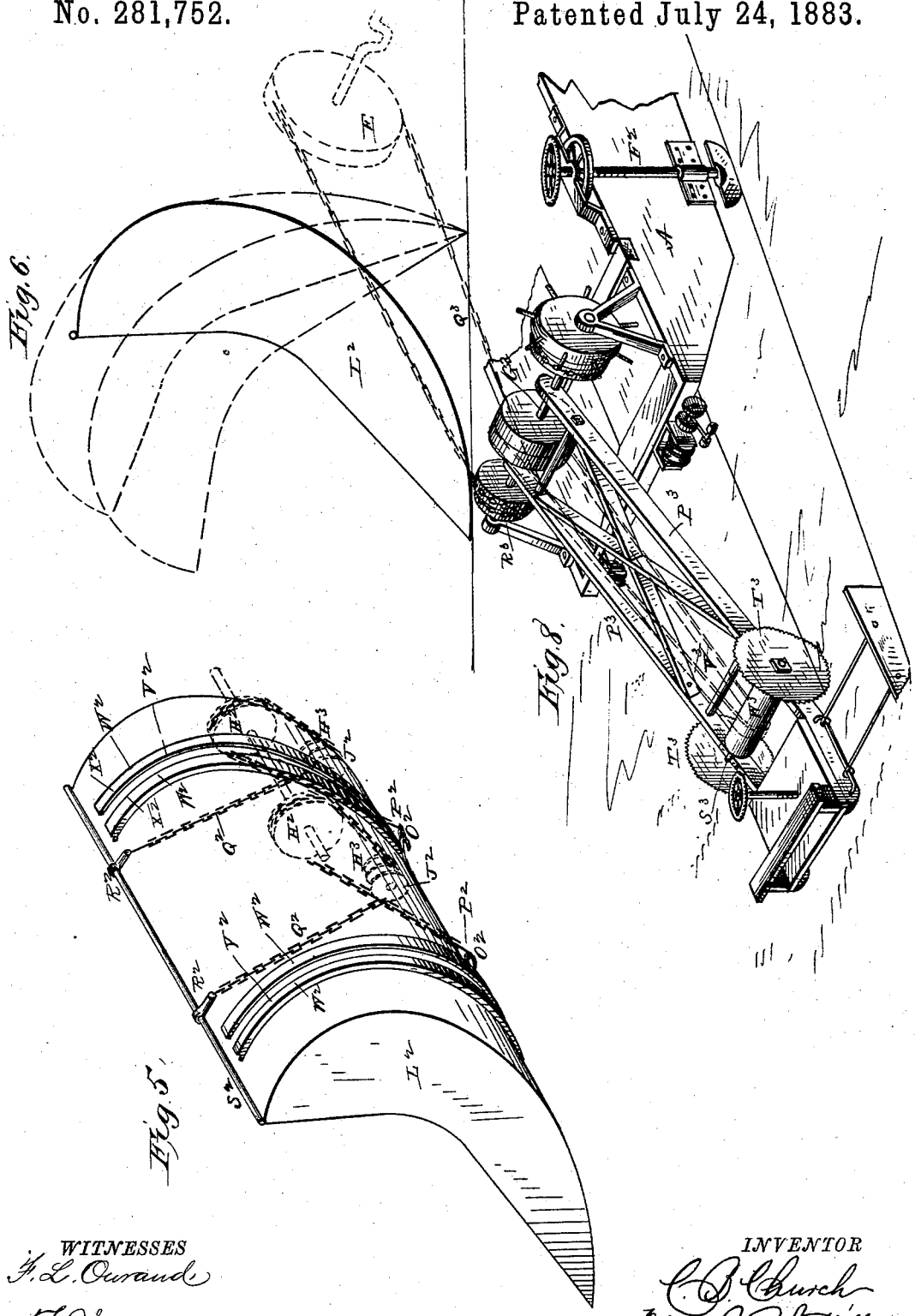

(No Model.) 5 Sheets—Sheet 5.
C. B. CHURCH.
ICE HARVESTER.
No. 281,752. Patented July 24, 1883.
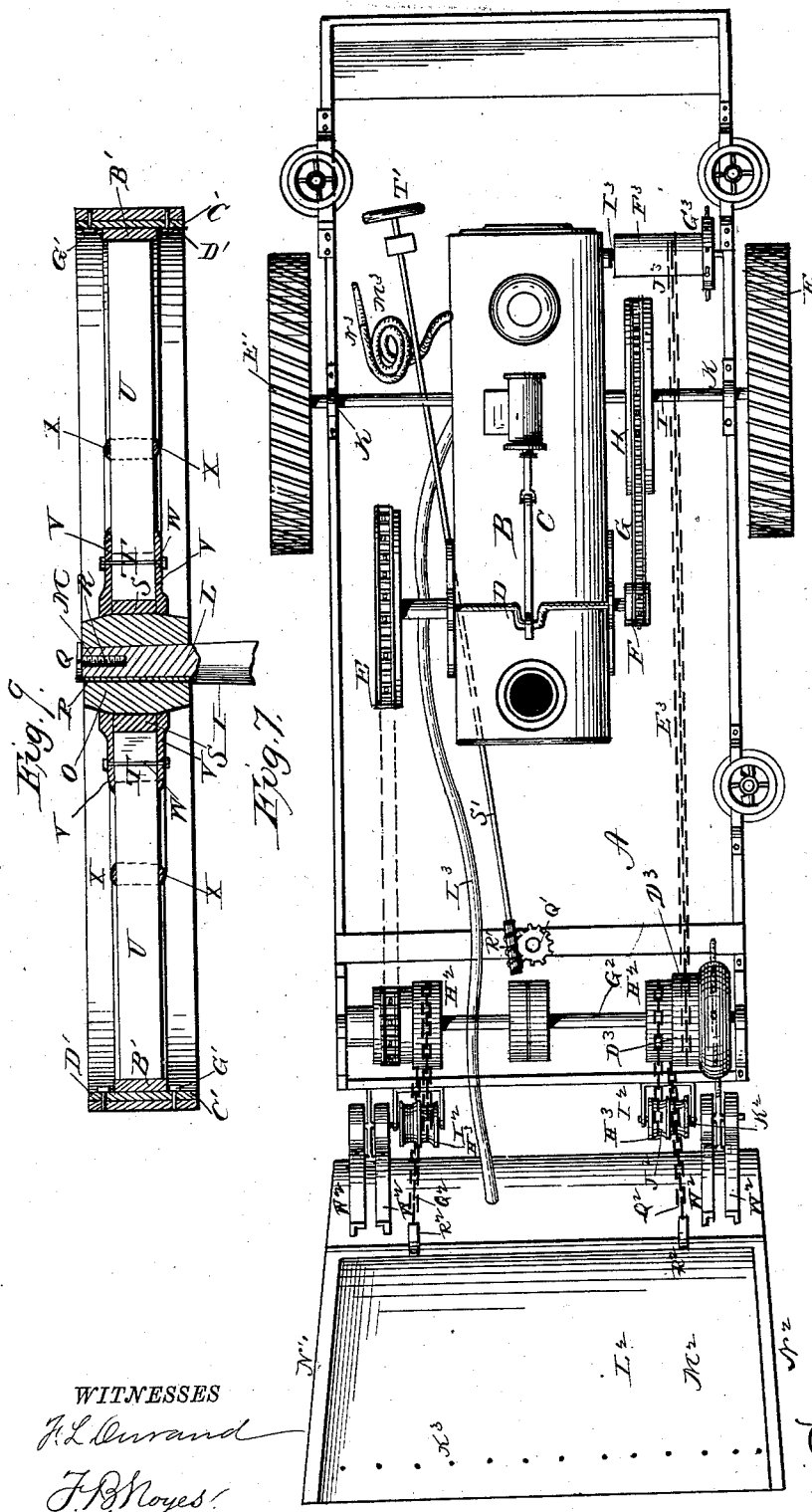
WITNESSES
INVENTOR

UNITED STATES PATENT OFFICE.

CHARLES B. CHURCH, OF WASHINGTON, DISTRICT OF COLUMBIA.

ICE-HARVESTER.

SPECIFICATION forming part of Letters Patent No. 281,752, dated July 24, 1883.

Application filed November 6, 1882. (No model.)

*To all whom it may concern:*

Be it known that I, CHARLES B. CHURCH, a citizen of the United States, residing at Washington, in the District of Columbia, have invented certain new and useful Improvements in Ice-Harvesters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to ice-harvesting machines, and has for its object to provide a durable and efficient machine that will be light in weight, can be conveniently controlled, will be rapid in operation, and effect a great saving of labor.

To this end it consists, substantially, in a boat or float shaped body provided with steam-driving mechanism, drive-wheels, and runners, and having mechanism at its front end for attaching a scoop, cutter, marker, or scraper, as may be desired, its novelty consisting in the improved construction, arrangement, and operation of parts, as will be hereinafter more fully specified, and particularly pointed out in the claims.

In the drawings, Figure 1 is a perspective view of my improved ice-harvester. Fig. 2 is a vertical longitudinal sectional view thereof. Fig. 3 is a vertical transverse sectional view on the line $x\ x$, Fig. 2. Fig. 4 is a horizontal sectional view on the line $y\ y$, Fig. 2. Fig. 5 is a rear perspective detail view of the scoop and its operating-chain. Fig. 6 is a side view of the scoop, illustrating its operation by dotted lines. Fig. 7 is a top view of the ice-harvester. Fig. 8 is a perspective view of the front portion of the harvester, showing the ice-cutter in position. Fig. 9 is a vertical sectional detail view of one of the wheels in position. Fig. 10 is a transverse sectional detail view of one of the wheels in position. Fig. 11 is a vertical sectional detail view of one of the runners.

Corresponding parts in all the figures are denoted by the same letters of reference.

Referring to the drawings, A designates the body of my ice-harvester, which is constructed like a boat or float. In this boat A is arranged the steam driving and controlling mechanism, comprising the engine B, which may be of any desired suitable form or construction, and has its drive-rod C connected with a crank-shaft, D, having at each end a chain-wheel, F F, respectively. The latter wheel or pulley, F, is connected by a chain-belt, G, with a chain-wheel, H, on the main axle I of the machine, and by this means the axle is turned to drive the harvester forward. The axle I is journaled in suitable boxes, J J, on the engine, and also has bearings in journal-boxes K K at the sides of the boat A. The ends L L of axle I are formed tapering or conical, as shown, and are each provided with a longitudinally-disposed screw-threaded recess or hole, M.

N N designate the drive-wheels, which have each an interiorly-cone-shaped hub, O, which is placed on the correspondingly-shaped end L of the axle I, and is fixed thereon by a key-strip, P, in the usual manner, said strip being retained in place by the head or flange Q of a screw-bolt, R, which is screwed into the recess M in the end of the axle. The hub O of the wheels is provided with a central series of radial Λ-shaped longitudinally-disposed flanges, S, between which fit the tenon ends T of the spokes U. The spokes are retained in position at each side by disks V V and bolts W, the latter passing through the disks and ends of the spokes.

At some distance from the hub, at the point where the strain comes on the fixed wheels, is provided an auxiliary bracing-ring, X, which is held in place by the square sections Y on the spokes at that point, said sections Y being accommodated in corresponding perforations, Z, in said ring X.

The outer ends, A', of the spokes are secured in the outer felly or rim, B', in any suitable manner. This felly B' is provided with a broader tire, C', forming an extension or flange, D', laterally at each side of the felly B'. On this tire C' is arranged a series of diagonally-disposed transverse cogs, E'. These cogs are substantially Λ-shaped in cross-section, and are secured by bolts F' F', passing through the lateral extensions D' and secured by nuts G' G'.

Between every pair of cogs E' is secured, by bolts or rivets H', an elastic strip, I', having a central cushion, J', under it and against the tire. These strips I' and cushions J' are preferably formed of rubber, and may be integral with each other or separate and independent. Their operation is as follows: As the wheel revolves and the cogs engage in the ice, snow, &c., will clog in between the cogs, by reason of the tread of the wheel, and depress the said strips and elastic cushions. As soon as the pressure is removed, as the wheel turns, the cushion and strip, by reason of their elasticity, will immediately throw off all the snow, &c., from between the cogs. By this means clogging of the snow, which would prevent the cogs from holding in the ice, is prevented.

K' designates the steering-runner and support, which is arranged centrally and in front of axle I. This runner consists of a top piece, L', having downwardly-extending side flanges, M' M', in which are set the runner-blades N' N'. From top piece, L', extends a vertical rod, O', up through a tubular casing, P', in the boat or float A, and braced by a thwart $A^4$, as shown, and said rod is provided at its top with a pinion, Q'. This pinion Q' is engaged by a worm, R', on the end of a rearwardly-extending steering-rod, S', which is journaled in suitable bearings, and is provided at its rear end with a hand-wheel, T', for convenience in operating.

It will be seen that by turning rod S' its worm mechanism will turn, by means of its engagement with the pinion Q', the runner K' in either direction to guide the machine.

U' U' designate auxiliary guiding and supporting runners, placed one at each side of the rear portion of the boat or float A. These runners U' comprise a bottom guiding-blade, V', having a vertical stem or rod, W', working in a bracket, X', on the side of float A, and also having a bearing, Y', in a substantially ∩-shaped bracket, Z', on top of the boat A at its side. Rod W' is provided at its top, above bracket Z', with an operating hand-wheel, $A^2$, by which it may be turned to point the blades V' in any direction. Rod W' has also an annular shoulder, $B^2$, at its bottom, adapted to bear against the under side of bracket X', to limit vertical movement of the rod.

To provide for vertical movement of rod W' it is screw-threaded at its top portion, $C^2$, and on this screw-threaded portion is arranged a hand-wheel, $D^2$, working inside bracket Z', and having a screw-threaded central opening, $E^2$. By turning wheel $D^2$ it will be caused to bear against the bracket Z' and work the rod W' down, while by turning in the opposite direction it will bear against the boat A and guide rod W' up. The advantage of this vertical movement and adjustment of rod W' is that when it is desired to make a quick turn of the machine one rod W' may be lowered to raise the drive-wheel at its side off the surface, when the drive-wheel at the other side will quickly turn the machine as on a pivot. By these runners the harvester may also be slid sidewise when desired.

$F^2$ designates a guiding and supporting runner like runners U', which may be attached to the left side of the machine in front of the drive-wheel, as shown. The function of runner $F^2$ is that, when the ice-cutter is in operation at the front of the machine, these runners $F^2$ and the rear runner, U', on the left side will both run in the last kerf cut in the ice by the saws or cutters and hold the machine parallel with this kerf while the next one is being cut, all as shown in Fig. 8 of the drawings. By this means the blocks of ice will be of the same width.

The rear part of float or boat A is preferably provided with a cab, as shown in dotted lines, for the protection of the engineer or operator.

$G^2$ designates a transverse shaft journaled at the front of the machine on boat A, and carrying two fixed chain pulleys or wheels, $H^2 H^2$.

$I^2 I^2$ are two brackets projecting from the front of boat A under pulleys $H^2 H^2$, and each carrying a pulley, $H^3$, having two circumferential parallel grooves, $J^2 K^2$, respectively, toward the center and toward the side.

$L^2$ is the snow-scoop, which has a curved back and bottom, $M^2$, and correspondingly-shaped sides $N^2 N^2$. On its under side or back, $M^2$, the scoop is provided with two eyes, $O^2 O^2$, into which are hooked the ends $P^2$ of two removable securing and operating chains, $Q^2$. Each of these chains $Q^2$ is continued from the eye $O^2$ up and over the groove $J^2$ of the pulley $H^3$, from whence it passes over and around the chain-pulley $H^2$ and under and around groove $K^2$, from which latter its end is continued up and provided with a hook-plate, $R^2$, that is hooked over the top edge, $S^2$, of the scoop.

Shaft $G^2$ has also a fixed hand-wheel, $T^2$, by operating which the shaft $G^2$ is caused to turn with the pulleys $H^2$, which carry chains $Q^2$, and the scoop is thus drawn up on its front edge, $U^2$, for dumping.

The operation of the scoop is as follows: It is adjusted so that its sharp front edge, $U^2$, will scoop up the snow, &c., off the surface of the ice, which position is shown in full lines, Fig. 6, of the drawings. When the scoop is full, it is drawn up on its edge $U^2$, as shown in dotted lines, Fig. 6, and is dumped over to the final position shown in dotted lines, same figure, by forward movement of the harvester. After the load is thus dumped, the scoop may be returned to its original position by operating wheel $T^2$.

To provide for easy movement of the scoop, it has two tracks, $V^2$, on its back, each track consisting of two parallel rails, $W^2 W^2$, having lateral flanges $X^2$ longitudinally on their adjoining inner edges. Against these flanges run rollers $Y^2 Y^2$, journaled on the ends of the head $Z^2$ of a T-rod, $A^3$, projecting from the front of float A. Each T-rod $A^3$ has also a cross-extension, $B^3$, carrying rollers $C^3$ at each end, which rollers work against the outer edges of the rails $W^2$.

Instead of operating the scoop from the front of the machine by wheel T², its operation may be effected by the engineer from his post in rear of the engine by means of the following mechanism:

Shaft G² is provided with a fixed chain-wheel, D³, connected by a chain, E³, with a drum, F³, on a hand-wheel, G³, at the rear of boat A. Wheel G³ is fixed on a suitable shaft, I³, and the ends J³ J³ of chain E³ are wound in opposite directions around the drum F³, so that the movement of wheel D³ may be effected in either direction.

The back and bottom M² and sides N² N² of scoop L² are preferably formed hollow, and a row of perforations, K³, is provided, running along near the outer edge of the sides N² N² and across the back M², near its front edge, U², all the perforations opening on the inside of the scoop. The object of this is that, should the scoop become clogged with the snow or slush, steam may be introduced into the hollow scoop by a flexible pipe, L³, and escape through the perforations to melt the snow or slush and cause it to slide off the scoop. The pipe L³ extends from the engine and enters the scoop at the back.

In order that the clogged snow, &c., may be melted at any point desired in the scoop, should occasion require, a flexible pipe or hose, M³, may be provided, to extend from the engine, and having a steam-jet device at its end N³, which may be directed at the desired place.

When the surface of the ice has been completely cleared of all snow, the scoop is removed from the machine by unhooking and drawing the chains Q² Q² off their pulleys, and the cutter O³ (illustrated in Fig. 8 of the drawings) is substituted. The construction of this ice-cutting mechanism O³ need not be completely described here, as the device is to be the subject of a separate application for Letters Patent; but it is attached to the machine after the scoop is removed, and operated in the following manner: Its supporting-frame P³ is hooked over shaft G², and motion is communicated to drive said shaft by means of a chain belt, Q³, extending from the chain-wheel E on the crank-shaft of the engine to a chain-wheel, R³, fixed on shaft G². This rotary motion of shaft G² is transmitted to the shaft S³, which carries the saws or cutters T³ T³, by means of a chain belt, U³, extending from a chain-pulley, V³, fixed on shaft G², to a chain-pulley, W³, on shaft S³. By this means a rotary motion is imparted to the cutting-saws.

In lieu of the chain-pulleys and chain belts herein shown, plain band belts and pulleys may of course be used, and numerous other modifications in construction, changes in material, &c., may be made without departing from the spirit of my invention.

The operation and advantages of my invention will be readily understood and appreciated. It is simple in construction, very effective and efficient in operation, and can be conveniently controlled by one man in rear of the engine. Besides, the complete mechanism is supported on the boat or float, which, should the harvester break through the ice, will readily float and support the whole machine.

I claim as my invention—

1. An ice-harvester having its body formed of a boat or float, which is mounted upon drive-wheels, by which it is to be driven on the ice, and carries the harvesting mechanism inside or on top, so that the harvester will float with all the mechanism in case of accidental breaking through the ice, as set forth.

2. The herein-described front guide-runner, comprising the top piece having side flanges extending downwardly, and a vertical rod provided with a top pinion, which is engaged by a worm on the operating-rod, as set forth.

3. The combination, with the body of the harvester, having the drive-wheels, of the guiding and lifting runners in rear of said wheels, said runners being vertically adjustable, and having a rotary adjustment to govern the direction in which they travel, and a centrally-arranged front steering-runner, as and for the purpose set forth.

4. The combination, with the body of the harvester, having mechanism in front adapted for the attachment of different kinds of harvesting implements, of a rear guide-runner, and a like front runner on the left side, as and for the purpose set forth.

5. The combination, with the body of the harvester, constructed like a boat or float, and carrying driving mechanism for operating a rotary axle on which the drive-wheels are fixed, and having the centrally-arranged front tubular casing, of the steering-runner consisting of the top piece having downwardly-extending side flanges provided with the runner-blades, and the vertical rod having the pinion which is engaged by a worm on the end of the rearwardly-extending operating-rod, as set forth.

6. The body of the harvester, carrying driving mechanism for operating its main rotary axle on which the drive-wheels are fixed, and having guide and lifting runners on both sides in rear of said wheels, an auxiliary runner on the left side in front of the wheel, a central front guide-runner having operating mechanism, and a transverse shaft at its front end, which is adapted to be operated by the driving mechanism of the harvester and to in turn operate the harvesting implement, as set forth.

7. The combination, with the body of the harvester, having suitable bearing-brackets, of a guiding and lifting runner comprising a runner-blade having a vertical stem or rod provided at its top with a hand-wheel or other operating device, and screw-threaded on its upper portion, on which threads work a centrally-screw-threaded elevating-wheel, as set forth.

8. In an ice-harvester, the combination of the rotary axle having tapering or conical ends, and provided with a screw-threaded recess or hole in the end, the drive-wheels having a hub adapted to fit said conical end and keyed thereon, and the retaining large-headed or flanged screw-bolt arranged in the screw-threaded recess in the end of the axle, as and for the purpose set forth.

9. In an ice-harvester, the herein-described drive-wheel, consisting of the hub having the series of radial longitudinally-disposed flanges, between which fit the tenon ends of the spokes, the lateral retaining-disks, the auxiliary ring or felly, and the outer rim or felly, as set forth.

10. In an ice-harvester, a drive-wheel having the hub, spokes, and outer rim or felly, and provided between the latter and the hub with an auxiliary bracing-ring, as set forth.

11. In an ice-harvester, the combination, with the wheel having the felly and broader tire forming lateral extensions, of diagonally-disposed cogs secured against the tire by means of bolts or other fastening devices passing through said extensions, as set forth.

12. In an ice-harvesting machine, a drive-wheel having peripheral cogs, between which is arranged an elastic cushion, as and for the purpose set forth.

13. In an ice-harvester, a drive-wheel having peripheral cogs adapted to enter the snow or ice, and provided between every pair of cogs with an elastic strip having an under cushion bearing against the periphery of the wheel, as and for the purpose set forth.

14. In an ice-harvester, the herein-described drive-wheel, having the hub and spokes, an intermediate auxiliary bracing ring or felly, and an outer rim or felly provided with a broader tire, on which are arranged diagonally suitable cogs, as set forth.

15. In an ice-harvester, the herein-described hollow scoop, having perforations opening on its face, and provided with a pipe leading from the boiler, so as to conduct steam into the scoop, as and for the purpose set forth.

16. In an ice-harvester, the combination of the herein-described hollow scoop, having the curved back and sides, and provided with a row of perforations opening on its face or inside, and extending along the sides and across the front near the edges, and the flexible steam-pipe entering the scoop at the back, the whole adapted to be applied to an ice-harvesting machine having steam driving mechanism, as set forth.

17. The flexible steam tube or hose having a steam-jet device at its end, in connection with the engine of a steam-driven ice-harvester having a snow and slush scoop, as and for the purpose set forth.

18. The combination, with the body of the ice-harvester, of an adjustable scoop having operating-chain mechanism.

19. The combination, with the pulleys on the rotary shaft, and the lower double-grooved pulleys, of the adjustable scoop provided with the operating-chains continued from the lower edge of the scoop up and over one groove, and from thence around the pulleys on the shaft, under and around the other groove, and to the top edge of the scoop, as and for the purpose set forth.

20. The combination, with the body of the harvester, having the drive-wheels, and provided with the transverse shaft at its front, said shaft having the pulleys and operating mechanism, and the lower brackets carrying the double-grooved pulleys, of the scoop having the curved back, and the removable operating-chains passing around and over said pulleys, and hooked over the top edge of the scoop, as set forth.

21. The combination, with the T-rods provided with rollers and projecting from the body of the harvester, of the adjustable scoop having the curved back, on which are arranged the guiding-tracks formed of parallel rails having lateral flanges on their adjoining inner edges, as set forth.

22. The combination, with the body of the harvester, having the adjusting pulleys and guides, of the scoop adapted to be attached at the front of the harvester, and provided with operating-chains and guide-tracks, as and for the purpose set forth.

23. The combination of the body of the ice-harvester, carrying the driving mechanism connected with the rotary axle carrying the drive-wheels, the guiding and supporting runners, the transverse shaft at the front of the body, provided with hand-operating mechanism, and adapted to be connected with the drive-shaft of the driving mechanism, the pulleys on the transverse shaft, the projecting rods or guides at the front, the double-grooved pulleys, the removable and adjustable scoop having the guiding-tracks, and the adjusting-chains of the scoop, as set forth.

In testimony whereof I affix my signature in presence of two witnesses.

CHARLES B. CHURCH.

Witnesses:
JOHN T. C. CLARK,
J. R. LITTELL.